Patented Mar. 1, 1938

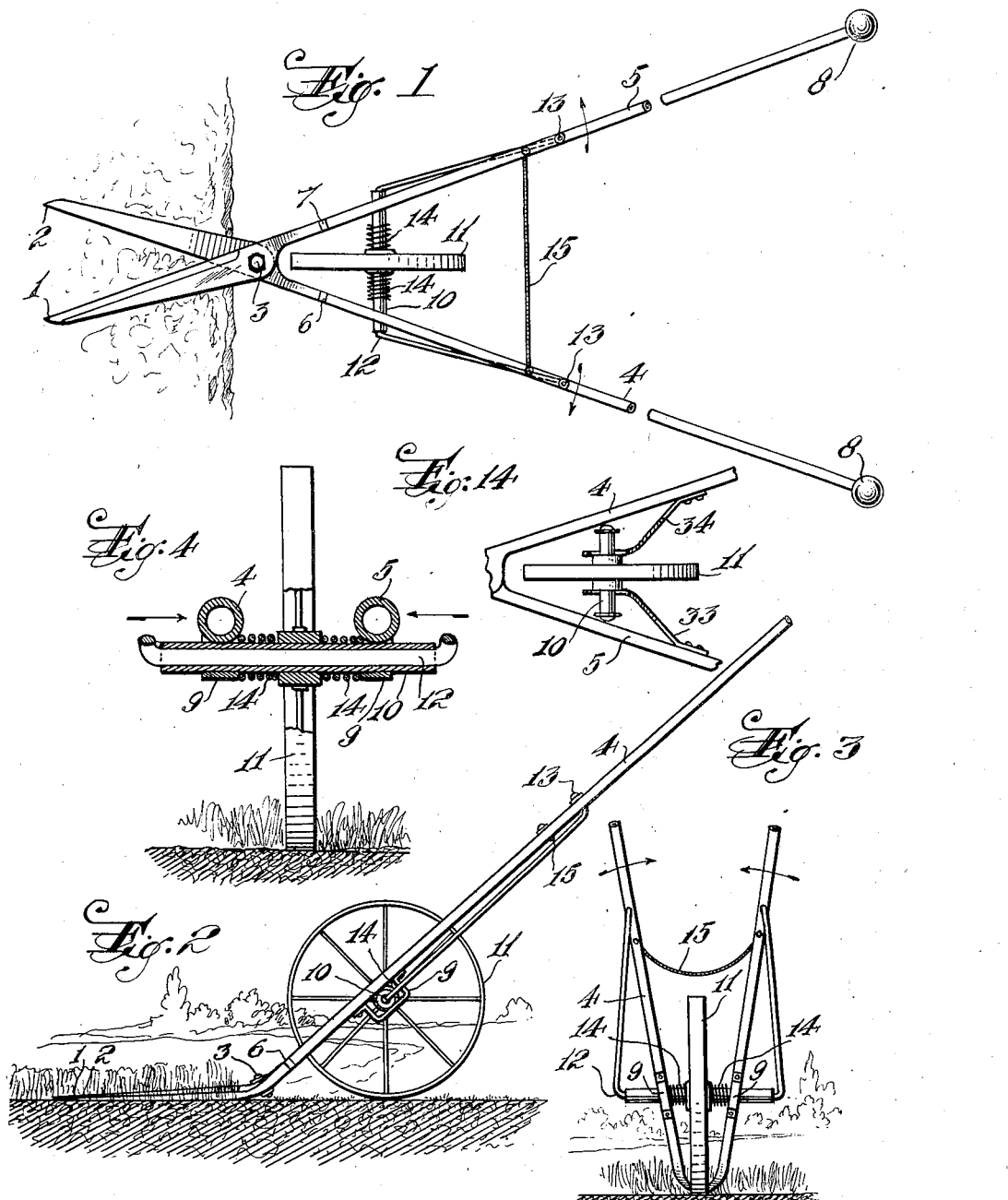

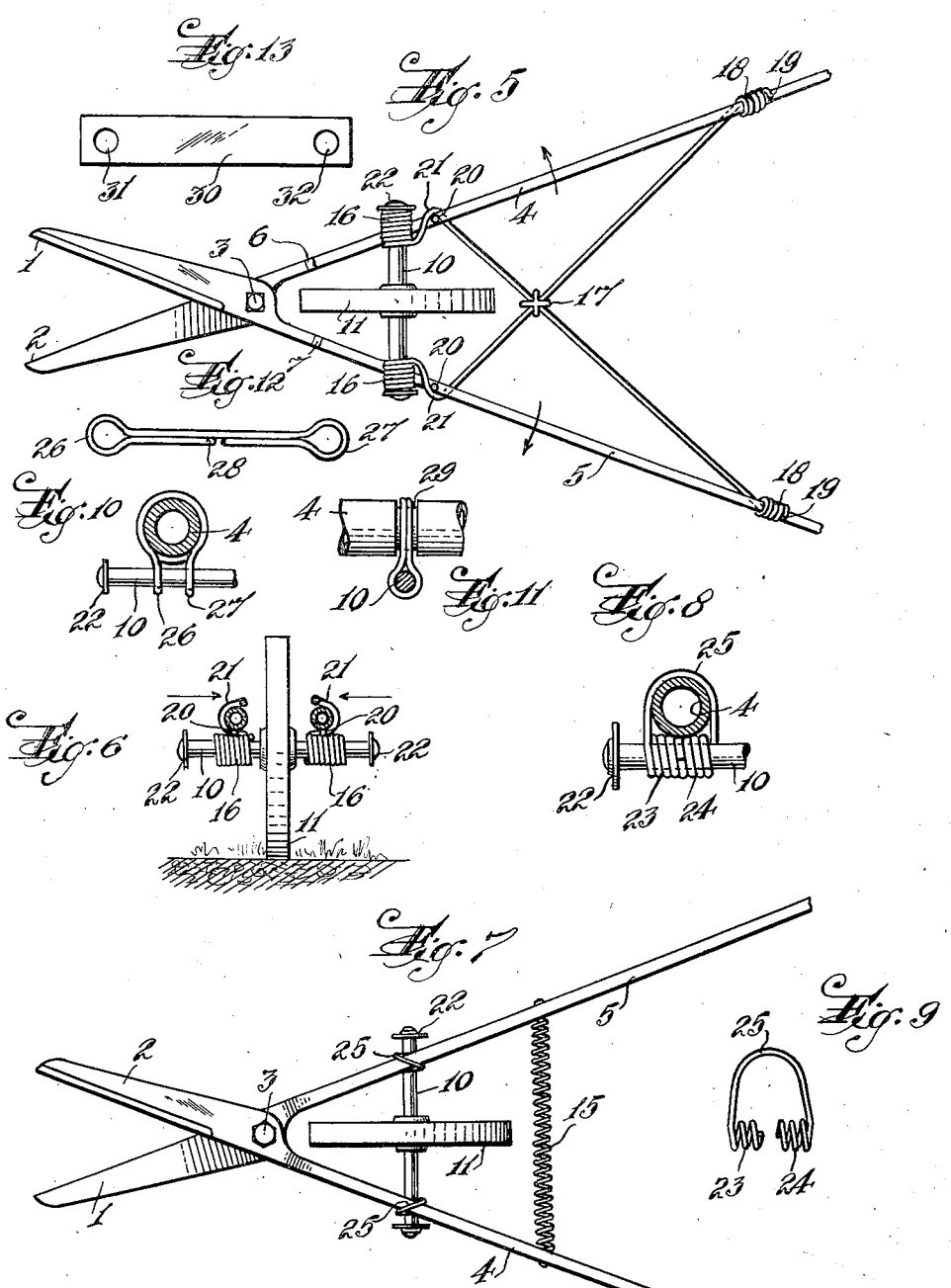

2,109,623

UNITED STATES PATENT OFFICE 2,109,623

GRASS CLIPPER

Denis T. O'Sullivan, West Orange, N. J.

Application September 22, 1937, Serial No. 165,100

14 Claims. (Cl. 56—241)

The invention relates to an implement used for clipping grass and the like.—The implement is especially adapted for use in trimming grass around fences, bushes and walks of a lawn where a lawn mower cannot reach.

It is one of the objects of my invention to provide a simplified form of grass clipper of the stand-up type so that it is not necessary for the user to get down on his knees to do the clipping.

While attaining the principal object of the invention, it is a further object to provide a grass clipper which is much simplified over numerous forms with which I am familiar, and therefore one which is cheap to manufacture.

Another object of the invention is to provide a grass clipper which is easy to operate, yet efficient in its operation.

These and other objects will be apparent from a reading of the specification, taken in connection with the annexed drawings, wherein:

Figure 1 is a plan view of one form of the clipper.

Figure 2 is a side elevation of the clipper shown in Figure 1.

Figure 3 is a view of the clipper shown in Figures 1 and 2, but looking at the underneath or bottom side, with the handles moved to carry the shears to closed position.

Figure 4 is a part-sectional and part-elevational view through the wheel spindle and handles of the implement shown in Figure 3.

Figure 5 is a bottom view of a modified form of implement.

Figure 6 is a view similar to Figure 4, but showing the wheel mounting of Figure 5.

Figure 7 is a view similar to Figure 5, but showing a further modified form of construction.

Figure 8 is a fragmentary view showing one form of mounting the wheel axle to the handles, as in Figure 7.

Figure 9 shows one form of spring which may be used with the wheel mounting of Figure 8.

Figure 10 shows a further modified form of mounting the wheel axle to the handles.

Figure 11 is a view of Figure 10, looking from right to left.

Figure 12 is a plan view of the spring mounting means shown in Figures 10 and 11.

Figure 13 shows a modified form of mounting member which may be used in place of that shown in Figure 12.

Figure 14 is a fragmentary view of a further modified form of supporting the wheel directly from the handles.

In the various views, wherein like numbers refer to corresponding parts, 1 and 2 are shears operatively pivoted together at 3. To these shears are attached handles 4 and 5 which may be of any satisfactory material; for example, in the form of hollow rods or pipes which are welded to the shears at the points 6 and 7. The handles are provided with any satisfactory type of knobs 8.

As shown in Figures 1 to 3 inclusive, the handles 4 and 5 are each provided with a support member 9 which is fastened thereto in any satisfactory manner. As indicated, the supports 9 are in the form of brackets in which are positioned the ends 10 of the spindle of a wheel 11. As shown in Figures 1 to 3, the spindle 10 is hollow and carries a U-shaped member 12 which is more or less flexible, preferably being made of steel wire of suitable diameter. The arms of the U-shaped member 12 are fastened to their respective handles preferably by a pivot joint as indicated at 13. By this construction it will be seen that when the knobs 8 are pressed toward each other by the hands of the operator to close the blades 1 and 2, the ends of the spindle 10 slide through the bracket supports 9.

Preferably the spindle 10 carries on each side of the wheel 11, a resilient member in the form of a coil spring 14 which assists in spreading the handles 4 and 5 after the shearing operation. These springs also assist in centralizing the wheel 11 between the handles. In order that the handles 4 and 5 may not spread too far, a member 15, in the form of a cord or spring, may be used as indicated.

In Figure 5 the wheel spindle 10 has one or more turns of wire 16 looped around the spindle, one end of each of the wires 16 being carried around its associated handle, and after passing through a guide member 17, has one or more convolutions 18 passing around the handle at a distance from the spindle 10. The extremity of the turns 18 has its end 19 going into a hole in the handle. Preferably a pin 20 is used to position the turn or loop 21 around its respective handle. Each end of the spindle is provided with a guard member 22 to prevent the wire convolutions 16 from sliding off the spindle.

In Figure 7, each end of the spindle 10 is held to its respective handle by a single loop 25, the ends of which form coils 23 and 24 around the spindle 10, as shown in Figure 8, the spring itself being indicated in Figure 9. If desired, the coils 23 and 24 of the spring member may be interleaved, one with the other.

In Figure 10, each end of the spindle 10 is fastened to its respective handle by a member formed as shown in Figure 12, in which spring wire is used, preferably formed to provide two loops 26 and 27 which are positioned as shown in Figure 10. Each of the handles, for example 4 as shown in Figure 11, is provided with a groove 29 to position the portions of the clamp between the loops 26 and 27, and one end, 28, of the wire clamp is preferably bent downwardly to enter a hole in the handle. From this construction, it will be seen that as the handles 4 and 5 are moved toward and away from each other to operate the blades 1 and 2, the spindle 10 will slip through the loops 26 and 27.

Instead of making the clamp as in Figure 12, a flat piece of material, such as indicated at 30 in Figure 13, is used. Preferably, this material is of resilient metal and is provided with holes 31 and 32 to accommodate the ends 10 of the spindle.

In Figure 14 the ends 10 of the wheel spindle are supported on resilient support members 33 and 34 attached to their respective handles 5 and 4. In this construction the free ends of the members 33 and 34 are slotted so that the spindle ends 10 may slide therein as the handles 4 and 5 are moved. The spindle ends 10 in this case are shorter than in the other forms described, and they need not necessarily span the distance between the handles 4 and 5 when these handles are in extended or open position. It will be noted that the resilient members 33 and 34 act to assist in opening the shears after the closing operation, because they are so formed and positioned that when the handles 4 and 5 are moved to closed position, as indicated in Figure 14, they are placed under some strain which tends to move the handles apart.

From what has been said, it will be observed that certain of the detail construction may be varied considerably, without departing from the spirit of my invention or the scope of the appended claims.

What I claim is:

1. In an implement of the class described, a pair of cutting blades cooperatively pivoted together and each having a handle extending upwardly at an angle to its blade from a point adjacent the pivot, a wheel located between said handles near said pivot, said wheel having an axle spanning at least the distance between the handles when in open position, and means for supporting the axle on the handles so the axle can slide transversely through said support means as well as to rotate therein.

2. An implement as defined in claim 1, further characterized in that the wheel spindle is hollow to receive a U-shaped flexible member having the arms of the U movably attached to the handles a substantial distance from the axle.

3. An implement as defined in claim 1, further characterized in that the wheel spindle is hollow to receive a U-shaped metal rod, the arms of the U being pivotally attached, one each to each handle a substantial distance from the axle.

4. An implement as defined in claim 1, further characterized in that the wheel axle is supported so the wheel protrudes upwardly between the handles a distance nearly equal to its radius.

5. An implement as defined in claim 1, further characterized in that the wheel axle is held to the handles by resilient means engaging the axle and each handle on opposite sides of the wheel.

6. An implement as defined in claim 1, further characterized in that the wheel axle is held to the handles by spring members looped around the axle, one on each side of the wheel, and passing over its associated handle.

7. An implement as defined in claim 1, further characterized in that the wheel axle is held to the handles by coiled spring members looped around the axle, one on each side of the wheel, and passing at least once over its associated handle.

8. An implement as defined in claim 1, further characterized in that the wheel axle is held to the handles by coiled spring members looped around the axle, one on each side of the wheel, and passing at least once over its associated handle, said coiled spring member being in one piece with the convolutions at its end.

9. An implement as defined in claim 1, further characterized in that the wheel axle is held to the handles by coiled spring members looped around the axle, one on each side of the wheel, and passing at least once over its associated handle, said coiled spring member being in one piece with the convolutions at its end, said convolutions being arranged so as to intermesh to form a lock.

10. An implement as defined in claim 1, further characterized in that the wheel axle is held to the handles by spring members looped around the axle, one on each side of the wheel, and passing over its associated handle, each spring member having a pair of spaced loops embracing the wheel axle and the portion between the loops passing over the associated handle, with means for anchoring said portion to the handle.

11. An implement as defined in claim 1, further characterized in that the wheel axle is held to the handles by a single-piece spring member for each handle on each side of the wheel.

12. An implement as defined in claim 1, further characterized in that the wheel axle is held to the handles by a single-piece spring member for each handle, the spring member being looped once around the axle on each side of its associated handle, and the loop ends passing over the handle and fastened in position thereon.

13. A stand-up grass clipper including a pair of cutting blades pivoted together and having handles extending upwardly at an angle to the plane of the blades, a relatively large wheel positioned between the handles and extending a substantial distance above them, and resilient means for supporting the wheel axle directly on the handles so the handles may be laterally shifted on the axle in operating the blades.

14. A stand-up grass clipper including a pair of cutting blades pivoted together and having handles extending upwardly at an angle to the plane of the blades, a relatively large wheel positioned between the handles and extending a substantial distance above them and having an extended axle, support members attached directly to said handles and carrying said axle so the handles may be laterally shifted on the axle in operating the blades.

DENIS T. O'SULLIVAN.